United States Patent [19]

Rotolico et al.

[11] Patent Number: 4,582,254

[45] Date of Patent: Apr. 15, 1986

[54] DEVICE FOR THE CONTROLLED MULTIPLE FEEDING OF POWDER MATERIAL

[75] Inventors: Anthony J. Rotolico, Hauppauge; Edward Spinella, Freeport, both of N.Y.

[73] Assignee: Eutectic Corporation, Flushing, N.Y.

[21] Appl. No.: 617,911

[22] Filed: Jun. 6, 1984

[51] Int. Cl.[4] .......................... B65G 53/40; B05B 7/24

[52] U.S. Cl. .......................................... 239/80; 239/85; 239/307; 406/118; 406/121; 406/123; 406/134

[58] Field of Search ................. 406/36, 118, 121, 123, 406/134, 138, 144, 146; 239/74, 79, 80, 85, 307; 222/161, 189, 196, 278, 288

[56] References Cited

U.S. PATENT DOCUMENTS

| | | | |
|---|---|---|---|
| 545,837 | 9/1895 | Baker | 222/278 X |
| 2,181,612 | 11/1939 | Smith | 222/189 |
| 3,428,098 | 2/1969 | Slay | 406/36 X |
| 3,476,320 | 11/1969 | Fleischhacker et al. | 239/85 |
| 3,574,410 | 4/1971 | Buschor | 406/123 |
| 3,826,540 | 7/1974 | Jensen | 406/123 |
| 4,067,150 | 1/1978 | Merrigan | 222/196 X |
| 4,262,034 | 4/1981 | Andersen | 406/138 X |
| 4,391,860 | 7/1983 | Rotolico et al. | 406/144 X |

FOREIGN PATENT DOCUMENTS

| | | | |
|---|---|---|---|
| 986559 | 3/1965 | United Kingdom | 406/121 |

*Primary Examiner*—Jeffrey V. Nase

*Attorney, Agent, or Firm*—Hopgood, Calimafde, Kalil, Blaustein & Judlowe

[57] ABSTRACT

Plural powders are supplied to one or more torches from different fluidized-powder zones, and plural independent lines through each of these zones enable each torch to be supplied with one or more independent lines of powder flow to the nozzle-discharge region of each torch.

13 Claims, 11 Drawing Figures

DEVICE FOR THE CONTROLLED MULTIPLE FEEDING OF POWDER MATERIAL

BACKGROUND OF THE INVENTION

The invention relates to a powder-feeding system for gas-propelled delivery of a powder to be controllably supplied, as to a flame-spraying gas torch or to a transferred-arc or non-transferred plasma torch.

Various schemes have been proposed for the aspiration of powder into a flow of carrier gas, but for one reason or another they have lacked the precision with which it is desirable to controllably meter the delivery of powder to a torch for torch deposition to a surface to be coated or otherwise treated by the powder.

U.S. Pat. No. 3,976,332 attacks the problem by so configuring a downwardly open orifice in a carrier-gas tube within the convergent lower region of a powder-supply hopper that, in the presence of a fluidizing-gas flow from the top of the hopper and through the body of powder in the hopper, a fluidized powder regime will be established in the immediate vicinity of the orifice, thereby providing fluidized powder under pressure for conveyance by the carrier-gas flow. This technique has the disadvantage that the pressure drop of fluidizing gas must necessarily be some function of the instantaneous head of undischarged powder within the hopper.

U.S. Pat. Nos. 4,381,898 and 4,391,860 operate on the principle of fluidizing powder in a fluidizing chamber which receives fluidizing-gas flow from below a porous screen, in the context of a gravitational flow of powder via a relatively small central discharge location above the porous screen. A carrier-gas conduit extends transversely through the fluidizing chamber; this conduit has an upwardly facing opening facing the powder-discharge location, and a shed between this opening and the powder-discharge location sufficiently laps the opening that only gas-fluidized powder can be delivered by carrier-gas flow.

Precisely controlled and satisfactory as the latter system has proven for conveyance of fluidized powder in a single line of carrier-gas flow, there have been problems in the delivery of powder at the torch, resulting in a lack of uniformity, i.e., in an inability to control uniform torch deposition of powder, particularly for the greater rates of deposition which the powder feeder is able to deliver.

Attempts to solve the problem by splitting powder (and carrier-gas) flow into two separate delivery hose lines, in order to have powder enter a torch flame, particularly a plasma flame, have been unsuccessful at a satisfactory level of flow rate. And when rates are adopted to achieve desired quantities of powder delivery, the flame (particularly in the case of a plasma flame) becomes deflected and a substantial fraction of the powder is wasted by not penetrating the flame sufficiently for proper melting to occur.

BRIEF STATEMENT OF THE INVENTION

It is an object of the invention to provide improved powder-feeding apparatus of the character indicated.

A specific object is to provide powder-feeding apparatus to enable improved quality in the torch deposition of powder supplied via such apparatus.

Another specific object is to provide powder-feeding apparatus with the ability to independently deliver plural feeds of gas-propelled powder from a single source of powder supply.

A further object is to meet the above objects with accurate conjoint powder delivery in all of the plural feeds.

It is also an object to provide a single powder-feeding apparatus having the capability of supplying independent flows of gas-propelled powder to plural torches.

Still another object is to meet the above objects with structure lending itself to simple and rapid modification for efficient conversion of use, from one to the next and different kind of job application.

The invention achieves the foregoing objects in a hopper-type structure of the character disclosed in said U.S. Pat. Nos. 4,381,898 and 4,391,860, by providing a powder-fluidizing chamber wherein gas-fluidizing of the powder is substantially uniform throughout a relatively large volume of the chamber and wherein plural independent carrier-gas lines traverse the part of the chamber in which fluidized powder is necessarily uniformly distributed. Each carrier-gas line has its own shed-protected one or more orifices via which fluidized powder is independently induced into the line, and each line with its flow of fluidized powder is delivered directly to the nozzle-discharge region of torch or the like utilization apparatus.

BRIEF DESCRIPTION OF THE DRAWINGS

The invention will be illustratively described in detail in conjunction with the accompanying drawings, in which.

DETAILED DESCRIPTION

Figure 1:
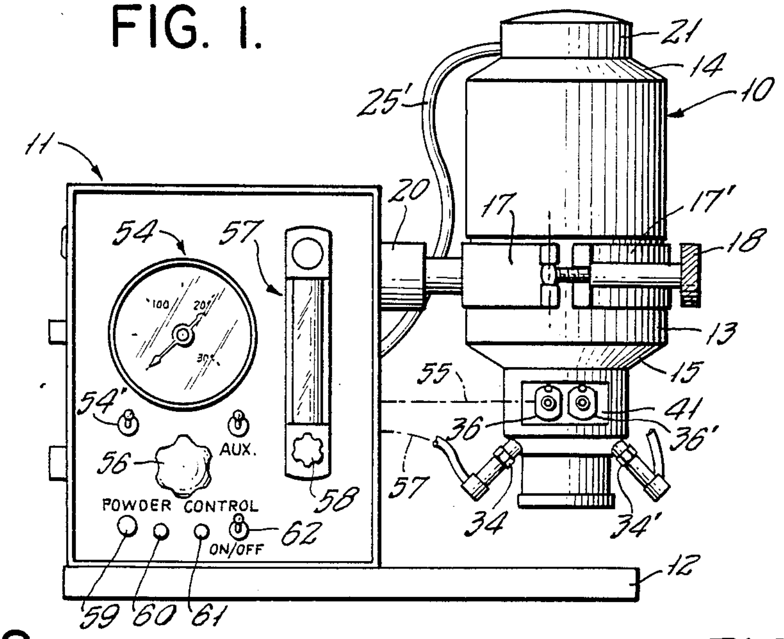
FIG. 1 is a simplified view in elevation of powder-feeding apparatus of the invention.
Figure 2:
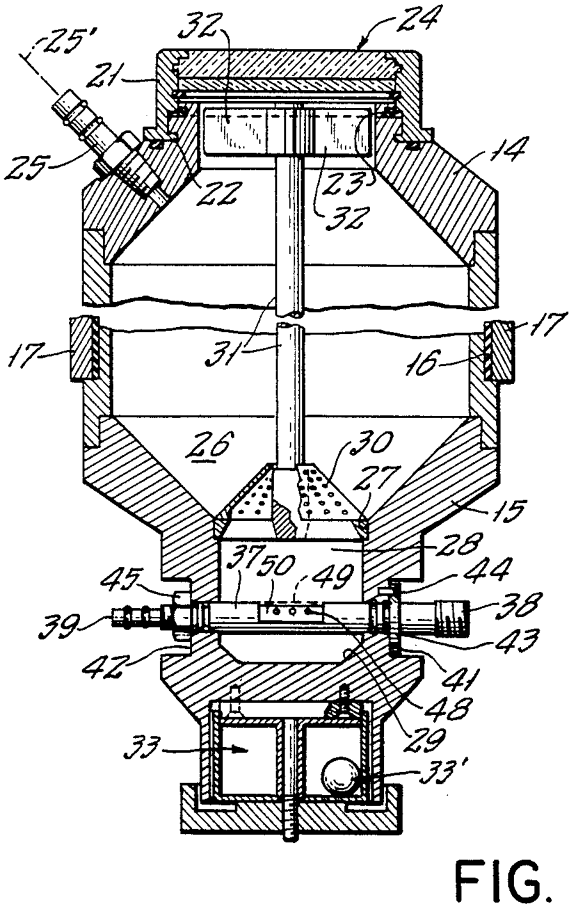
FIG. 2 is an enlarged fragmentary view in elevation of one component of the apparatus of FIG. 1, a portion being broken away and in vertical section.

In FIG. 1, a powder-supply and dispensing unit 10 and its controls 11 are shown carried by a base 12. The unit 10 includes a cylindrical hopper body 13, with fitted upper and lower end-closure members 14-15, for containment of a supply of powder to be controllably dispensed. A circumferential groove 16 in body 13 accommodates articulated arcuate halves 17-17' of a clamp having quick-release means 18 for selectively drawing together the unarticulated ends of halves 17-17'. As seen in FIG. 2, the clamp halves 17-17' are preferably lined with resilient material 19, to permit optional availability of a degree of vibratory gyration, to be later discussed. The unit 10 is mounted via clamp half 17 and fixed mounting-hub structure 20 forming part of the housing of control unit 11. The quick-release means 18 will be understood to facilitate rapid replacement of unit 10 (dedicated, for example, to the containment and dispensing of a first powder) with another unit 10 (dedicated to the containment and dispensing of a second powder).

The upper closure member 14 is shown with a large central opening which is selectively closed by a cap 21 having removable bayonet-locking engagement at 22 to the neck or rim of the opening. The locked engagement is sealed by an O-ring 23, and transparent means 24 forming the closure wall of cap 21 enables visual inspection of the currently loaded condition of unit 10 at all times; a quick-disconnect port fitting 25 in member 14 is shown with a flexible-tube vent connection 25' to control unit 11.

The lower end-closure member 15 has a relatively large central opening and is characterized by a convergent inner wall or hopper formation 26; the central opening is shown with a short counterbore 27 at the upper end of the cylindrical inner wall of a cup-shaped fluidizing chamber 28 which is characterized by an annular convergent bottom region 29. A downwardly divergent screen 30 is removably seated at counterbore 27 and divides a supply of powder material (in the upper or hopper region of unit 10) from such powder material as may have gravitationally sifted through screen 30 for fluidizing in chamber 28; screen 30 is shown carried at the lower end of a rod 31, the upper end of which is characterized by manually engageable stabilizing struts 32 which locate in the central opening of end member 14.

Fluidizing in chamber 28 occurs only in the circumstance of a flow of fluidizing gas via the bottom of chamber 28. This flow of fluidizing gas is permitted only in the circumstance of vent action via fitting 25, the fluidizing gas flow being admitted via flexible-hose connection from control unit 11 to one or more quick-disconnect fittings 34-34' at the bottom of chamber 28; such flow may be via a porous membrane at the bottom of chamber 28, as shown in U.S. Pat. No. 4,381,898, but a porous screen (not shown) in each of fittings 34-34' is adequate. The flow of such gas will be understood to permeate the supply of powder material in the hopper region and to so locally agitate powder at openings of screen 30 as to cause screen passage of powder at a rate proportional to fluidizing gas flow, it being understood that mesh size at 30 is selected for compatability with fineness of the particular powder, to achieve the indicated action.

Illustrative means contained within control unit 11 is described in detail in said U.S. Pat. Nos. 4,381,898 and 4,391,860 (particularly in connection with FIG. 5 thereof) and therefore need not be repeated here. It suffices, in connection with FIG. 6 herein, to indicate by legend that a single source of inert gas, such as argon, may supply a first line including a regulator valve 35, with parallel connections to the respective fluidizing-gas fittings 34 (34') at the bottom of the fluidizing chamber 28; that this same single source of inert gas may concurrently provide carrier-gas supply via a "flowmeter" line to the respective inlet-end connections 38-38' of distributors 36-36'; and that valve control in the vent line connected to fitting 25 is so interlocked with valve control in the carrier-gas supply via regulator 35 that venting can occur only when carrier-gas flow is shut off, the vent line being closed when carrier gas is flowing.

The kind of fluidizing action described above will be seen to apply to the relatively large volume of fluidizing chamber 28, i.e., relatively large as compared with a fluidizing chamber as described in said U.S. Pat. No. 4,391,860, and it has been discovered that multiple independent carrier-gas entrainments of powder can be concurrently taken from a single such volume of sufficient size. It has been further discovered that for each such independent rate of powder entrainment with separate carrier-gas flow, the rate of powder entrainment in each separate carrier-gas flow is directly related to the rate of fluidizing-gas flow. These discoveries have important implications for single-torch applications and for multiple-torch applications, as will be illustratively discussed in connection with FIGS. 6 to 10, after first completing the description of multiple-powder feeds in the apparatus of FIGS. 1 to 5.

Figure 3:
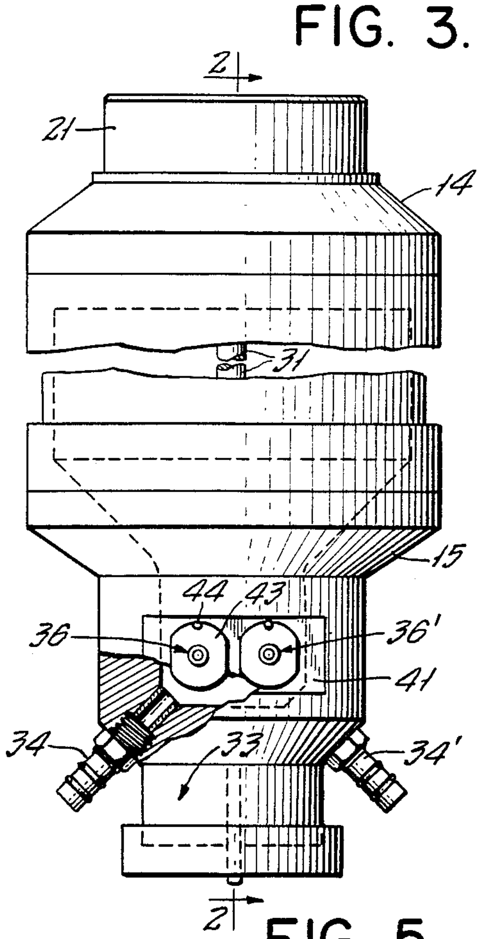
FIG. 3 is another view in elevation on the scale of FIG. 2, but on the aspect from the right of FIG. 2, the section of FIG. 2 being marked 2—2 in FIG. 3.

Multiple independent carrier-gas entrainments of powder are taken from fluidized powder in the single chamber 28, via independent carrier-gas lines, each of which includes its own powder distributor, at passage through chamber 28. As shown in FIGS. 1 to 3, there are two such distributors 36-36' on spaced parallel alignments in a horizontal plane, and FIGS. 4 and 5 are illustrative of either one of these distributors.

Figure 4:
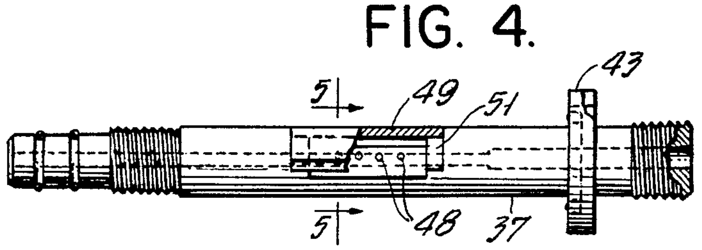
FIG. 4 is a further enlarged view in elevation of powder-distributor structure in the apparatus of FIGS. 1 to 3.
Figure 5:
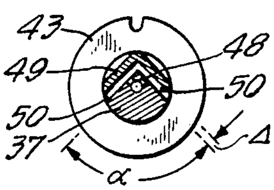
FIG. 5 is a sectional view taken at 5—5 in FIG. 4.

The distributor of FIGS. 4 and 5 comprises an elongate cylindrical body 37 extending horizontally from its carrier-gas inlet end 38 to its powder-delivery discharge end 39. Body 37 has a central through-passage 40 for accommodating flow of carrier gas. Body 37 is removably assembled in horizontally aligned mounting bores through the body of chamber 28, on one of two spaced parallel chords through a horizontal section of chamber 28, being vertically interposed between the bottom of chamber 28 and the powder-discharge screen 30. For ease of distributor mounting, the two spaced chord alignments of bores are normal to milled parallel flats 41-42 at diametrically opposite regions of the body exterior of chamber 28. For each distributor 36 (36'), a flange 43 seats on the flat 41 at the inlet end and has keyed angular orientation with respect to a locating pin 44 (as via a key slot in the rim of flange 43). The cylindrical body 37 preferably has sufficient clearance with the aligned bores in walls of chamber 28, to permit easy bodily removable insertion of the involved distributor 36 (36'), with reliance on pairs of resilient O-rings to seal each wall passage of body 37. At the powder-delivery discharge end 39, a given distributor assembly to the chamber 28 is secured by a single nut 45, set against the adjacent flat 42, and the discharge end 39 projects beyond nut 45 for acceptance of a suitable quick-disconnect fitting (not shown) of flexible hose to torch or other utilization means.

At a locally recessed region of each distributor 36 (36'), one or more upwardly directed openings 48 enable powder fluidized within chamber 28 to enter the central passage of body 37 and thus to be conveyed via means 39 to the utilization means. And a shed 49 carried by body 37 is interposed in vertical clearance relation between opening(s) 48 and the screen 30. As shown, the central recess is defined by milled flats 50 parallel to the axis of body 37 and oppositely sloped at an included angle $\alpha$ which is at least no greater than twice the angle of repose of the powder, thereby assuring that when correctly oriented with respect to the vertical plane which includes the axis of body 37, no powder can adhere to either of the surfaces 50. Ledges 51 at longitudinal ends of the recess are parallel to adjacent flats 50 and at offset $\Delta$ therefrom, to provide precise and bonded seating for the respective roof panels of shed 49, as it will be understood that shed 49 is so accommodated within the recess of body 37 as to enable the above-described removability feature of body 37. It is also noted that the lower edge limits of the roof panels of shed 49 are both at an elevation well below that of opening(s) 48, thereby assuring against any direct gravitational entry of powder from screen 30, and thus permitting powder entry only for fluidized powder.

Externally exposed at the panel of control unit 11 is an indicator 54 of instantaneous back pressure, for carrier gas supplied in line 55 to the inlet connection 38 of one or both powder distributors 36 (36'). The schematic showing of FIG. 1 will be understood to mean that, in the event of both distributors 36-36' being supplied by the same line 55, the indicator 54 will be direct-reading in terms of carrier-gas flow in both distributors (36-36') at the same time; alternatively, the schematic designation 55 will be understood to mean that the two distributors (36-36') can receive independent carrier-gas flows which differ to a predetermined extent, in which case indicator 54 can selectively be direct-reading in terms of carrier-gas flow (1) in one distributor and, via suitable switching in unit 11 (control of which is indicated at 54') or (2) in the other distributor. In either event, indicator 54 will read a pressure which reflects downstream impedance attributable to the individual or combined powder distributors and their output connections, i.e., including their respective line connections to torch or the like utilization means.

A knob 56 labeled "Powder Control" is a manual means of adjustment of the pressure-regulating valve 35 in the fluidizing-gas supply to one or more lines 53 to fittings 34-34'; when knob 56 is turned in the direction to admit a flow of fluidizing gas to fittings 34-34', the back pressure reading at 54 will rise, almost directly in proportion to the rate of powder supply via the powder distributor, hence, the label "Powder Control" at knob 56. A second or flowmeter indicator 57 provides current readings of carrier-gas flow in the line(s) 55 to connection(s) 38; an associated adjustment knob 58 governs a variable orifice and is therefore a means of selecting flow rate, in re carrier gas supplied to inlet(s) 38. A fuse 59, green and amber lamps 60-61, and an on-off switch 62 complete the identification of exposed panel items.

Figure 6:
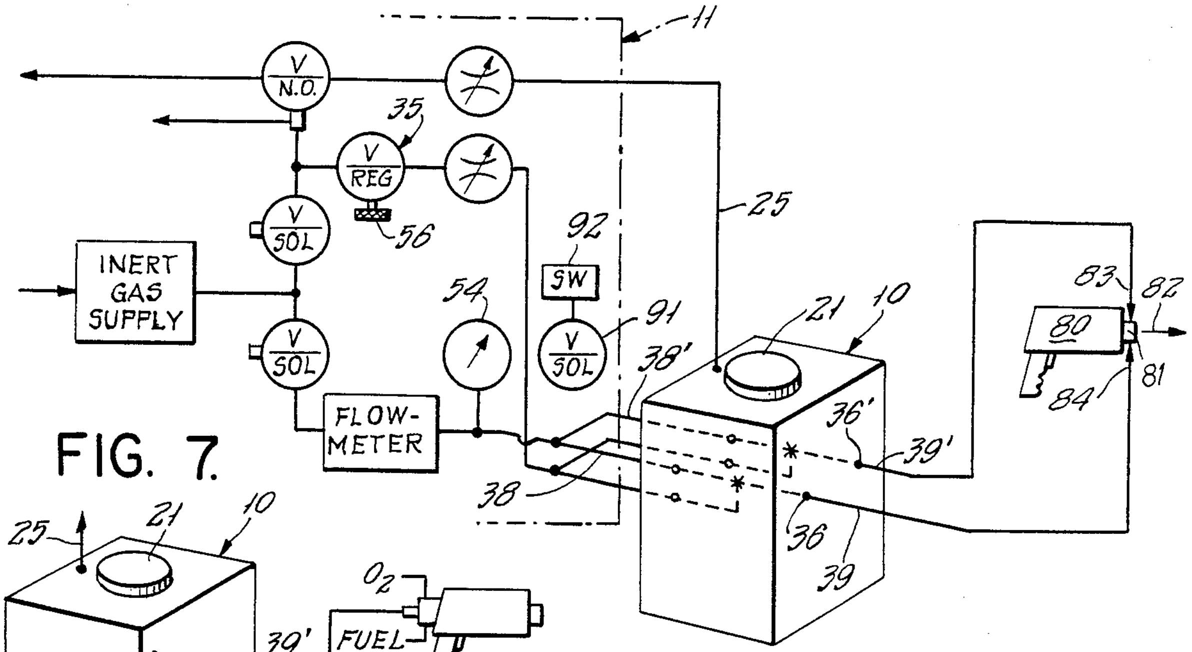
FIGS. 6 to 10 are schematic diagrams, partially isometric, to illustrate various use combinations for one or more units of the apparatus of FIGS. 2 and 3.

FIGS. 6 to 10 illustrate a variety of different torch combinations served by multiple powder-distributor means as above described. In FIG. 6, a single torch 80 will be understood to be a plasma-arc torch having a single nozzle 81, discharging in the direction of arrow 82. At or immediately downstream from this nozzle 81, separate diametrically opposed radially inward lines 83-84 are independently and flexibly connected to the respective delivery ends 39-39' of the two distributors 36-36' of powder-dispensing unit 10. The distributors 36-36' will be understood to pass through the same fluidizing chamber (28) within unit 10 and to supply like independent flows of powder and carrier gas for independent diametrically opposite discharges into the flame of torch 80. The result is a more uniform supply of powder to the flame, for more uniform deposit of sprayed powder-alloy droplets on a workpiece; such greater uniformity is to be understood to be as compared (a) to a single-point injection (as shown at 80 in FIG. 7 of U.S. Pat. No. 4,391,860), or (b) to a multiple-point injection from a single powder line. And the uniformity of the two injections is attributable to the independence of powder entrainment in separate carrier-gas flows, all the way to the respective points of independent discharge into the torch flame; this uniformity applies for any given selected control of the rate of fluidizing-gas flow, as determined by the setting of the single regulator valve 35.

Figure 7:
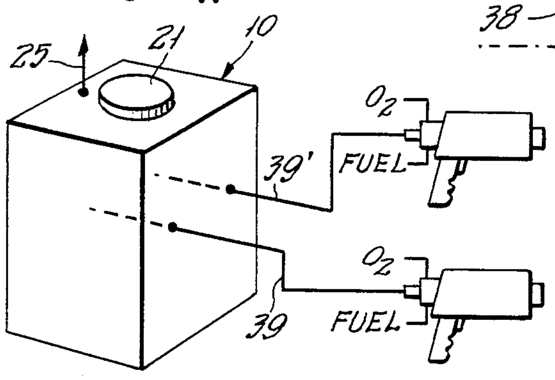

In FIG. 7, the single unit 10 will be understood to include the associated control means of FIG. 6 but to have its two separate powder-feed outputs 39-39' connected for concurrent supply of gas torches, the powder feed in each case being concentrically introduced within the oxygen and fuel connections to the respective torches, as is apparent from the drawing.

Figure 8:
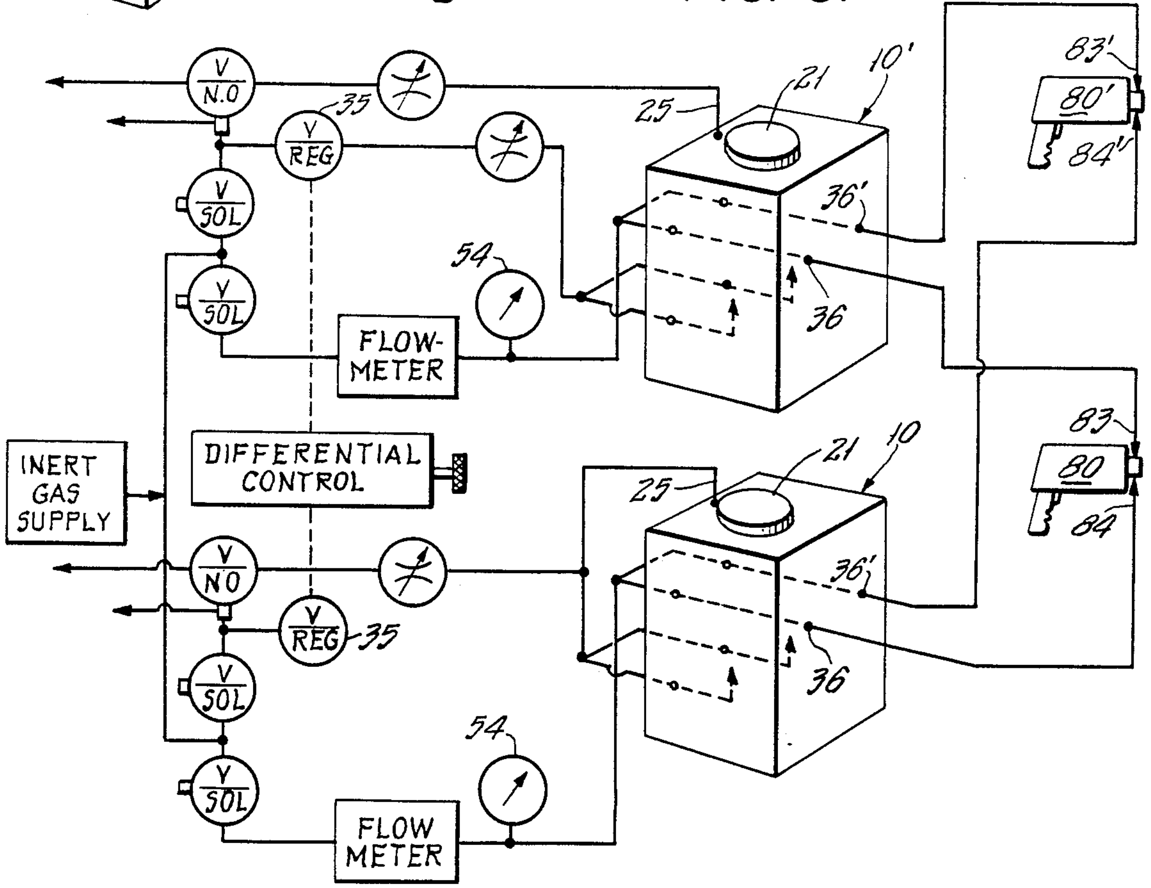

In FIG. 8, two powder-dispensing units 10-10' are each equipped with dual distributors (36-36') but will be understood to be stocked with a first powder in unit 10 and second powder in unit 10'. The two units 10-10' each serve two torches 80-80'. The distributor 36 of unit 10 is shown connected for discharge at 84 into the flame of torch 80, and the distributor 36 of unit 10' is shown connected for discharge at 83 into the same flame of torch 80; at the same time, the distributors 36' of the respective units 10-10' are shown connected for discharge at 84'-83' into the flame of torch 80'. The described connections will be understood to permit phased and/or concurrent flows of the two different powders available via units 10-10', the supply programming of these powders to torch 80 uniformly tracking the program of their supply to torch 80'.

Control systems for the respective units 10-10' of FIG. 8 are seen to be duplicative of the system shown and described in connection with FIG. 6. However, FIG. 8 further illustrates that, as in the manner described for FIG. 7 in said U.S. Pat. No. 4,391,860, a differential control may be operative to increase the regulator valve (35) setting for one of the control systems while descreasing the regulator valve (35) setting for the other control system, thus enabling controlled phase-in of one powder application via both torches during controlled phase-out of another powder application via both torches.

Figure 9:
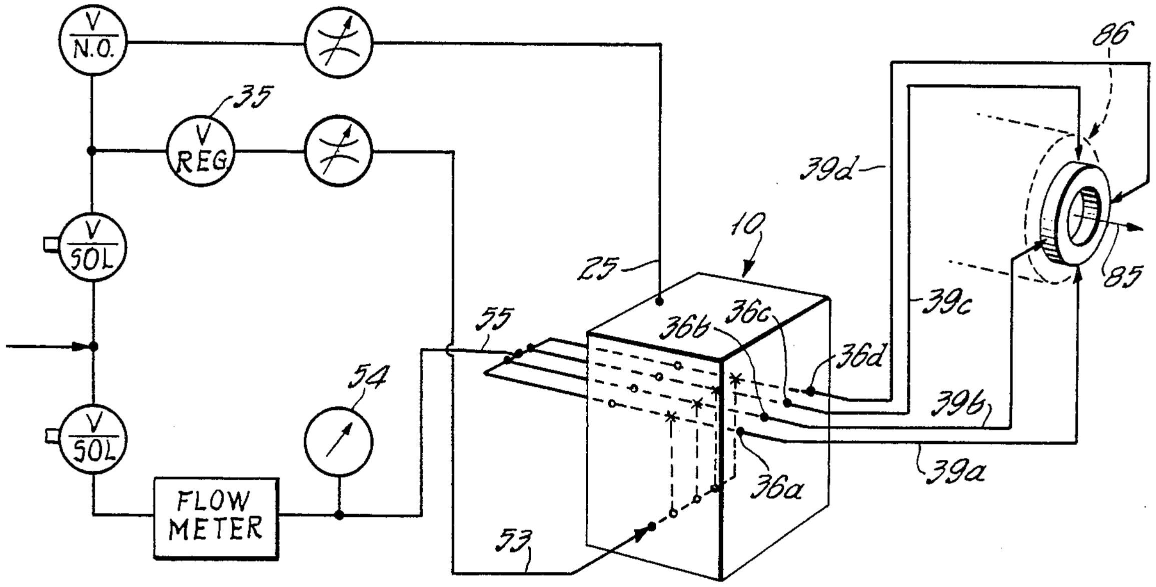

FIG. 9 illustrates that the invention is applicable to the servicing of more than two powder distributors from the same unit 10, there being four distributors *36a-36b-36c-36d* shown in spaced parallel array, which will be understood to be across the single fluidizing chamber 28 of unit 10. All four distributors are shown served as parallel connections to the same carrier-gas supply line 55, and the same fluidizing-gas line of course serves all distributors, in that fluidizing of powder is uniform within chamber 28, and the described structure (FIGS. 4 and 5) for each of the distributors assures uniformity of powder entrainment with the respective carrier-gas flows. The output lines *39a-39b-39c-39d* from the respective distributors may independently serve plural torches, but in FIG. 9 they are shown providing independent angularly spaced powder discharges directed to the axis 85 of a single torch 86.

Figure 10:
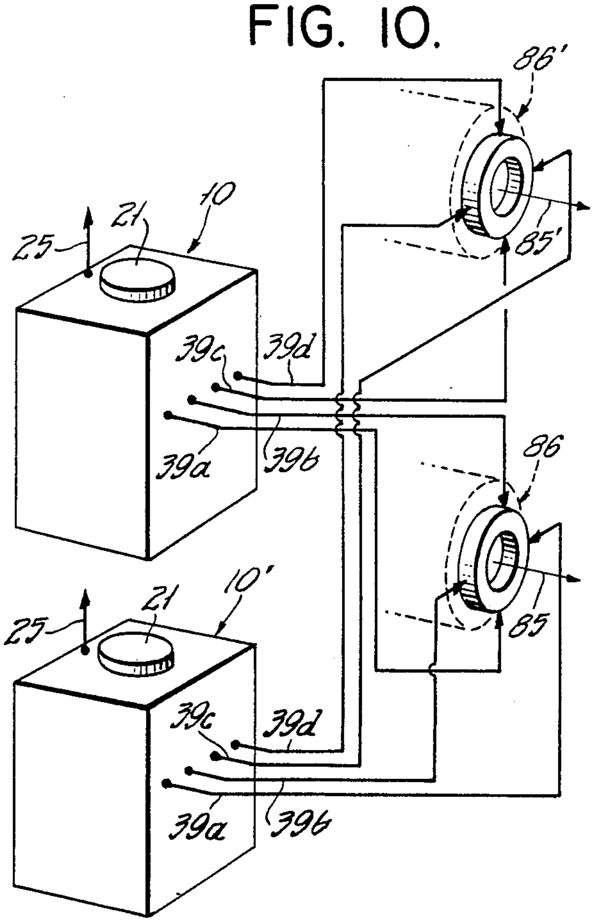

In the arrangement of FIG. 10, two units 10-10', each with four distributors *36a-36b-36c-36d* in parallel array through a single fluidizing chamber 28, are stocked with different powders in the manner described for the units 10-10' of FIG. 7. Two of the outlet lines *39a-39b* of unit 10 supply independent like flows of a first powder for direct diametrically opposed discharge toward the flame axis 85 of one torch 86 while the other two outlet lines *39c-39d* of unit 10 supply independent like flows of the first powder for similar diametrically opposed discharge toward the flame axis 85' of another torch 86'. At the same time, or in suitably phased control relation with the powder flows issuing from unit 10, the other unit 10′ is connected to supply a second powder to diametrically spaced points of powder discharge into the respective torch flames. To this end, the outlet lines 39*a*-39*b* of unit 10′ are shown connected for independent diametrically opposed discharge of second-powder material at torch 86, in interlace with the points of discharge of first-powder flow from unit 10, and the remaining outlet lines 39*c*-39*d* of unit 10′ are similarly connected for discharge of second-powder material at torch 86′, in interlace with the points of discharge of first-powder flow from unit 10.

Figure 11:
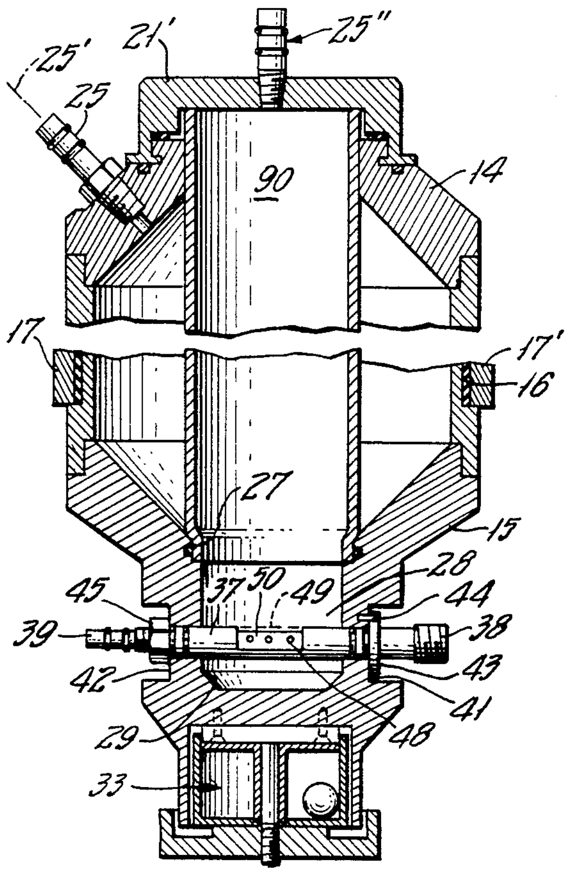
FIG. 11 is a view similar to FIG. 2 to show an accessory modification.

FIG. 11 illustrates that, in the event of experimental use of a torch or torches with the powder feeder of the invention, wherein a production-run charge of powder is not required, the screen assembly 30-31-32 of FIG. 2 may be removed and replaced by a much smaller capacity "hopper" 90 which may be of such reduced diameter as to be essentially an open-ended tube, seated and O-ring sealed at counterbore 27 and extending all the way to closure cap 21′. Venting is via a fitting 25″ in the special cap 21. The reduced volume of "hopper" 90 is found to be such that no sifting of powder is required for entrance into the fluidizing chamber 28. In other words, when "hopper" 90 and its cap 21′ are fitted for venting via 25″, the flow of fluidizing gas via fittings 34-35′ is sufficient to fluidize the powder, even though it will have been loaded (e.g., as a small charge of 500 grams) into chamber 28 and "hopper" 90.

The described invention will be seen to have met all stated objects. Importantly, two separate hoppers or two separate powder feeders are no longer needed to feed through two powder supply hoses, in that these hoses 39 (39′) can now be supplied by independent aspiration from the same single volume of powder fluidizing. Thus, it is now possible to utilize two plasma torches of two combustion torches being fed from one source. And in the case of a plasma flame, it is possible to increase coating quality by distributing powder particles more evenly, thereby utilizing more of the heat available for proper melting. Also, the invention makes it possible to reduce the required flow rate of fluidizing gas needed for power introduction into a plasma flame, thereby reducing the likelihood of oversaturation of the plasma flame.

While the invention has been described in detail for preferred embodiments, it will be understood that modifications may be made without departure from the invention. For example, in situations wherein less powder is required, accurate control of a good range of low-flow rates is still possible, merely by solenoid actuation of a valve 91, as under control of a switch 92 in FIG. 6, so that the powder-feeding unit is operative for carrier-gas flow in only one (36) of the plural distributors. Also, in the unusual event that a particular powder and/or its rate of carrier-gas entrainment is less than satisfactory with purely gravitational sifting at 30, a simple vibrator 33 (see FIGS. 2 and 3) may be activated as by coursing a flow of propellant gas (such as compressed air) around and within an annular chamber, and thereby orbiting a ball 33′ as an eccentrically gyrating mass within the annular chamber, i.e., at offset from the compliant suspension afforded by the resilient clamp liner 16.

What is claimed is:

1. Powder-feeding apparatus for carrier-gas delivery of a powder to be supplied to a torch or the like in loose particulate form, said apparatus comprising a plurality of carrier-gas lines each adapted at one end for connection to a source of carrier gas and each adapted at the other end for connection to a torch or the like, means for supplying Predetermined flows of carrier gas in said lines, a first powder-feeding device served by a first plurality of said carrier-gas lines, a second powder-feeding device served by a second plurality of said carrier-gas lines; each powder-feeding device comprising a powder-fluidizing chamber having independent fluidized-powder discharge-port connections to the respective carrier-gas lines served thereby, powder-supply means associated with said chamber, and a fluidizing-gas supply for said chamber; said fluidizing-gas supply being distinct and apart from said carrier-gas lines and including a regulating valve for each powder-feeding device, whereby the setting of the regulator valve for the first powder-feeding device may determine the rates of carrier-gas assimilation of a first powder into the respective carrier-gas lines associated with said first device, and whereby the setting of the regulator valve for the second powder-feeding device may similarly determine the rates of carrier-gas assimilation of a second powder into the respective carrier-gas lines associated with said second device, and a torch or the like having an axis of nozzle discharge, wherein at least one of the carrier-gas lines of said first powder-feeding device and at least one of the carrier-gas lines of said second powder-feeding device are independently connected to said torch at angularly spaced locations about said axis.

2. Apparatus according to claim 1, in which each of said powder-supply means comprises an upstanding generally cylindrical wall that is conically convergent to a restricted central opening at its lower end, said chamber being connected to said powder-supply means at said opening, and said respective carrier-gas lines traversing said chamber in generally horizontal and spaced parallel relation.

3. Apparatus according to claim 1, in which each of said first and second pluralities is two.

4. Apparatus according to claim 1, in which at least one of said first and said second pluralities is four.

5. Apparatus according to claim 1, in which corresponding pluralities of carrier-gas lines serve the respective powder-feeding devices, said apparatus further including at least a second torch, the said other ends of the respective carrier-gas lines associated with said first powder-feeding device being independently connected to different torches, and the said other ends of the respective carrier-gas lines associated with said second powder-feeding device being independently connected to the respective torches served by said first powder-feeding device.

6. Powder-feeding apparatus according to claim 1, in which each of said powder-feeding devices comprises a hopper having a convergent lower region communicating with the upper end of said powder-fluidizing chamber, said hopper having a removable cover establishing a sealed closure of the hopper, and a selectively openable venting means communicating with an upper region of the hopper.

7. Powder-feeding apparatus according to claim 6, in which said cover includes a transparent viewing panel.

8. Powder-feeding apparatus according to claim 6, in which sieve means is removably seated near the lower end of the convergent lower region, said sieve means including an upstanding stem extending for manual access when said cover is removed.

9. Powder-feeding apparatus for carrier-gas delivery of a powder to be supplied to a torch or the like in loose particulate form, said apparatus comprising a plurality of carrier-gas lines each adapted at one end for connection to a source of carrier gas and each adapted at the other end for connection to a torch or the like, means for supplying predetermined flows of carrier gas in said lines, a first powder-feeding device served by a first plurality of said carrier-gas lines, a second powder-feeding device served by a separate plurality of said carrier-gas lines; each powder-feeding device comprising a powder-fluidizing chamber having independent fluidized-powder discharge-port connections to the respective carrier-gas lines served thereby, powder-supply means associated with said chamber, and a fluidizing-gas supply for said chamber; said fluidizing-gas supply being distinct and apart from said carrier-gas lines and including a regulating valve for each powder-feeding device, whereby the setting of the regulator valve for the first powder-feeding device may determine the rates of carrier-gas assimilation of a first powder into the respective carrier-gas lines associated with said first device, and whereby the setting of the regulator valve for the second powder-feeding device may similarly determine the rates of carrier-gas assimilation of a second powder into the respective carrier-gas lines associated with said second device, a torch or the like having an axis of nozzle discharge, wherein the said other ends of said respective carrier-gas lines are independently connected to said torch at angularly spaced locations about said axis.

10. Apparatus according to claim 9, in which the carrier-gas lines of the first powder-feeding device are connected to said torch in angular interlace with connection of the carrier-gas lines of the second powder-feeding device.

11. Powder-feeding apparatus for carrier-gas delivery of a powder to be supplied to a torch or the like in loose particulate form, said apparatus comprising a plurality of carrier-gas lines each adapted at one end for connection to a source of carrier gas and each adapted at the other end for connection to a torch or the like, means for supplying predetermined flows of carrier gas in said lines, a single powder-fluidizing chamber having independent fluidized-powder discharge-port connections to said respective carrier-gas lines, powder-supply means comprising a hopper having a convergent lower region communicating with the upper end of said powder-fluidizing chamber, said hopper having a removable cover establishing a sealed closure of the hopper, selectively openable venting means communicating with an upper region of the hopper, and a fluidizing-gas supply for said chamber, said fluidizing-gas supply being distinct and apart from said carrier-gas lines and including a regulating valve, whereby the setting of said regulator valve determines the rates of carrier-gas assimilation of powder from said chamber and into the respective carrier-gas lines; an upstanding tubular member of substantially the reduced section of the lower end of the convergent lower region, said tubular member being removably adapted for sealed seating near the lower end of the convergent lower region, said tubular member extending to the upper end of the hopper, and an alternate cover removably closing the upper end of the hopper and having peripherally sealed fit to the upper end of said tubular member, said alternate cover including a vent fitting to enable selectively openable venting of the interior of said tubular member.

12. Powder-feeding apparatus for carrier-gas delivery of a powder to be supplied to a torch or the like in loose particulate form, said apparatus comprising a powder-fluidizing chamber, a hopper for containment of a relatively large production-run volume of powder to be fluidized and having a convergent lower region communicating with the upper end of said powder-fluidizing chamber, a carrier-gas line adapted at one end for connection to a source of carrier gas and adapted at the other end for connection to a torch or the like, means for supplying a predetermined flow of carrier gas in said line, said powder-fluidizing chamber having a fluidized-powder discharge-port connection to said carrier-gas line, and a fluidizing-gas supply for said chamber, said fluidizing-gas supply being distinct and apart from said carrier-gas line and including a regulator valve, said hopper including a selectively removable closure cover including a vent fitting, and an upstanding tubular member of substantially the reduced section of the lower end of the convergent lower region of the hopper, said tubular member being adapted for sealed seating near the lower end of the convergent lower region to thereby provide containment of a relatively short-run supply of powder to be fluidized, said closure cover when fitted to said hopper having peripherally sealed fit to the upper end of said tubular member.

13. Apparatus according to claim 12, in which a selectively removable closure cover includes a transparent viewing window.

* * * * *